US012579059B1

(12) United States Patent (10) Patent No.: US 12,579,059 B1
Doddaiah et al. (45) Date of Patent: Mar. 17, 2026

(54) PROBABILISTIC DATA PACKING USING FORECASTED COMPRESSION SIZE

(71) Applicant: Dell Products L.P., Round Rock, TX (US)

(72) Inventors: Ramesh Doddaiah, Westborough, MA (US); Xiangping Chen, Sherborn, MA (US); Jonathan Ichael Krasner, Coventry, RI (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/019,983

(22) Filed: Jan. 14, 2025

(51) Int. Cl.
*G06F 12/02* (2006.01)
(52) U.S. Cl.
CPC ................................. *G06F 12/0223* (2013.01)
(58) Field of Classification Search
CPC .................................................. G06F 12/0223
See application file for complete search history.

(56) References Cited

U.S. PATENT DOCUMENTS

2011/0196987 A1 * 8/2011 Benhase .............. G06F 3/0608
707/747

* cited by examiner

*Primary Examiner* — Jae U Yu
(74) *Attorney, Agent, or Firm* — Chamberlain, Hrdlicka, White, Williams & Aughtry; Aly Z. Dossa

(57) ABSTRACT

A method for managing data packing in a storage includes: receiving data from a computing device at a first point-in-time; analyzing the data to: determine characteristics of the data, and generate an extent for the data, in which the extent includes sequential tracks; analyzing sequential tracks to infer how a distribution of compression sizes change for the sequential tracks to obtain track-level in the compression sizes; forecasting, based on the characteristics of the data and the track-level changes in the compression sizes, a stability score of the distribution at a second point-in-time, in which the second point-in-time is after the first point-in-time; making a determination, based on the stability score, that the distribution would be the same in the second point-in-time; and placing, based on the determination, the tracks to a first zone in the storage, in which the storage further comprises a second zone and a third zone.

20 Claims, 5 Drawing Sheets

Zone A      Zone B      Zone C

*I/Os at current time*    *I/Os at future time*    *I/Os at current time*    *I/Os at future time*    *I/Os at current time*    *I/Os at future time*

*Stable data remains in-place with future data writes*

*Shrinking data is written in-place, potentially creating one or more gaps*

*Expanding data is padded, enabling future opportunities to write in-place*

System
100

IN <u>200</u>

Forecasting Engine <u>202</u>

PROBABILISTIC DATA PACKING USING FORECASTED COMPRESSION SIZE

BACKGROUND

Computing devices may include any number of internal components such as processors, memory, and persistent storage. Computing resources associated with (e.g., used by) each of these internal components may be used to generate, store, and backup data. Such utilization of computing resources may affect the overall performance of the computing devices.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

FIG. 2 shows a diagram of an infrastructure node in accordance with one or more embodiments disclosed herein.

DETAILED DESCRIPTION

Figure 1:
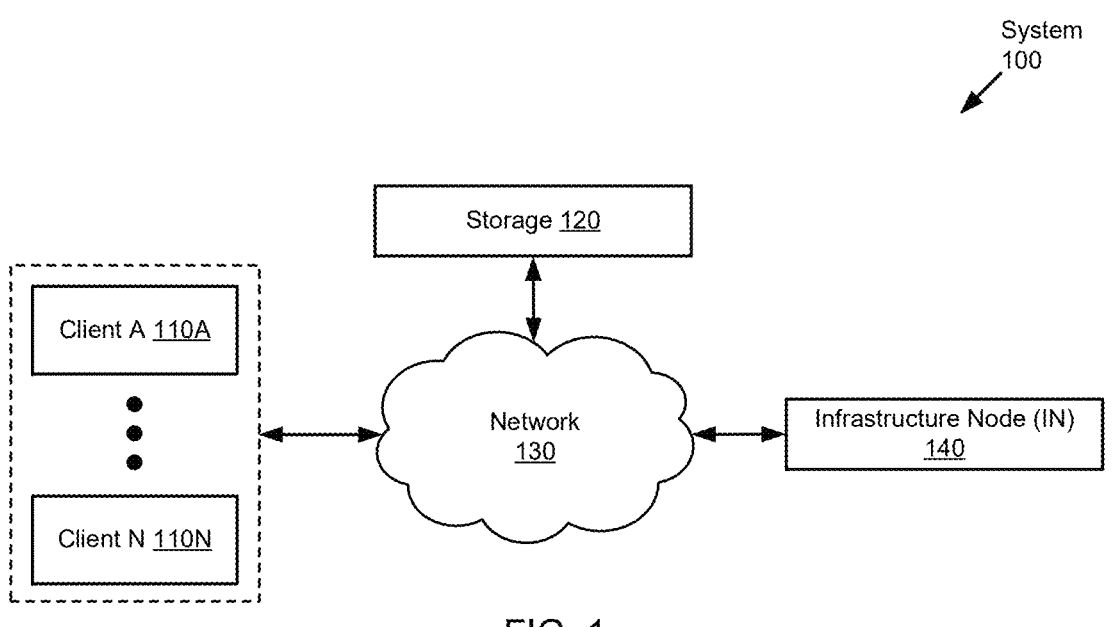
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, inefficient data packing (or inefficient data grouping in a storage (e.g., a storage based on two or more storage nodes)) leads to continuous data fragmentation, which reduces the overall efficiency of the storage. For example, at a first point-in time, a redundant array of independent disks (RAID) slice may need to host/keep/pack different data (or data writes), in which bank transaction related data (data write 1 (DW1)) (after compressing DW1 from 128 kilobytes (kB) to 8 kB) and stock purchase related data (DW2) (after compressing DW2 from 64 kB to 32 kB) may be packed together (after different compression ratios are applied to each data). At a second point-in time (which is after the first point-in time), a corresponding user may perform an action that causes another bank transaction (related to the same data). As a result of this transaction, the RAID slice may receive another DW (e.g., DWx) for the same data (128 kB in size), in which, after the compression, the compressed size of the data may not be the same (e.g., the compressed size of the data may be different from 8 kB) because of the nature/characteristics of the data.

In this example, if the compressed size of the data became larger than the original (e.g., if the compressed size of the data became 16 kB), a related component/entity of the storage may not overwrite the data because, originally (when the data was compressed to 8 kB), the data was tightly packed into the corresponding space in the RAID slice. For this reason, the component may pack/push/store the "16 kB" data to a different part (e.g., a different RAID slice) in the storage by generating an "8 kB" hole in the RAID slice (where the hole may be garbage collected (or not) to store another 8 kB data). When too many distributed holes (in different sizes) are created across the storage, the component may not use each hole (e.g., available space) effectively to store newer data writes, which may cause the continuous data fragmentation across the storage.

In order to overcome continuous data fragmentation across a storage, traditional approaches apply a defragmentation process across the storage. More specifically, as part of a defragmentation process, traditional approaches try to combine/merge two or more holes (e.g., in different tracks of a RAID) to generate a much bigger hole for newer data writes. However, performing a defragmentation process (and a related garbage collection process) require consumption of substantial computing resources (e.g., disk bandwidth (BW), central processing unit (CPU) cycles, and/or memory resources devoted to moving stale and cold data during the process), which results in higher write amplification of the related storage (e.g., Flash media) while reducing endurance (and capability) of the storage.

Further, traditional data packing approaches consider point-in-time snapshots of compressed size of incoming data writes, which may cause long-term fragmentation in a related storage. For example, tightly packed disk tracks (or backend tracks) at time 0 may cause higher degree of future fragmentations because of data relocations (across the storage) to find suitable space to pack newly ingested data (which requires frequent execution of computing resource intensive models).

For at least the reasons discussed above and without requiring resource-intensive efforts (e.g., time, engineering, etc.), a fundamentally different approach/framework is needed (e.g., a framework that employs a probabilistic data packing model/algorithm to cluster similar data together (from a data packing point of view such as packing characteristics of incoming data (or data writes)) in write journals using forecasted data reduction size stability).

Embodiments disclosed herein relate to methods and systems to manage data packing in a storage. As a result of the processes discussed below, one or more embodiments disclosed herein advantageously ensure that: (i) the framework reduces the need for frequent defragmentation (or disk defragmentation) in the storage; (ii) the framework improves performance/efficiency of the storage (e.g., a storage array) and reduces relevant disk wear and tear (by performing compressed in-place data writes); (iii) the framework performs track-level compressed data write size derivative forecasting; (iv) the framework clusters/groups similar size stability tracks; (v) the framework packs clustered tracks to correct zones (by generating inline defragmentation, where the inline defragmentation reduces the need for frequent background disk defragmentation and improves the storage's overall performance); (vi) the framework provides intelligent padding enabled journals to support data that is likely to expand in the future; (vii) the framework provides higher probability of in-place data writes for compressed tracks; (viii) the framework provides packing of time-correlated tracks; and/or (ix) the framework considers time and space dimensions for efficient data packing in the storage.

The following describes various embodiments disclosed herein.

FIG. 1 shows a diagram of a system (100) in accordance with one or more embodiments disclosed herein. The system (100) includes any number of clients (e.g., Client A (110A), Client N (110N), etc.), a storage (120), any number of infrastructure nodes (INs) (e.g., 140), and a network (130). The system (100) may include additional, fewer, and/or different components without departing from the scope of the embodiments disclosed herein. Each component may be operably/operatively connected to any of the other components via any combination of wired and/or wireless connections. Each component illustrated in FIG. 1 is discussed below.

In one or more embodiments, the clients (e.g., 110A, 110N, etc.), the storage (120), the IN (140), and the network (130) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110N, etc.) and the IN (140) are shown to be operatively connected through a communication network (e.g., 130), the clients (e.g., 110A, 110N, etc.) and the IN (140) may be directly connected (e.g., without an intervening communication network).

Further, the functioning of the clients (e.g., 110A, 110N, etc.) and the IN (140) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

As used herein, a "volume" may be analogous to a logical unit number in a storage area network (SAN), in which a volume may be a subset of the storage's (120) capacity presented by a storage node of the storage as a local block device. A volume's data may be evenly distributed across all storage resources of the storage (120), for example, according to a data layout selected for the storage (120).

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, data deduplication, etc.), storage capacity (e.g., data backup), and data protection (e.g., software-defined data protection, disaster recovery, etc.) as a service to users (e.g., people) of clients (e.g., 110A, 110N, etc.). For example, the system may be configured to organize unbounded, continuously generated data into a data stream. The system (100) may also represent a comprehensive middleware layer executing on computing devices (e.g., 500, FIG. 5) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IN (140)) from the users. By doing so, the users may utilize different computing devices (e.g., 500, FIG. 5) that have different quantities of computing resources (e.g., processing cycles, memory, storage, etc.) while still being afforded consistent user experience. For example, by performing some computations remotely, the system (100) (*i*) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110N, etc.) may include functionality to, e.g.,: (i) capture sensory input (e.g., sensor data) in the form of text, audio, video, touch or motion, (ii) collect massive amounts of data at the edge of an Internet of Things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (140)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (140). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene/environment), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may represent a physical appliance or a computing device operated by one or more individuals of (or employed by) an organization. Examples of said individual(s) may include, but not limited to, any organization executive(s) (e.g., chief executive officer (CEO), chief financial officer (CFO), etc.), and any employee(s) in the accounting/finance team of the organization (e.g., a collector person). Further, the organization may refer to any enterprise at least engaged in for-profit commercial, industrial, or professional activities.

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (140) and/or the storage (120). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110N, etc.) may be capable of, e.g.,: (i) collecting users' inputs, (ii) correlating collected users' inputs to the computer-implemented services to be provided to the users, (iii) communicating with the IN (140) and/or the storage (120) that perform computations necessary to provide the computer-implemented services, (iv) using the computations performed by, for example, the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (140), the storage (120), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be considered without departing from the scope of the embodiments disclosed herein.

Figure 5:
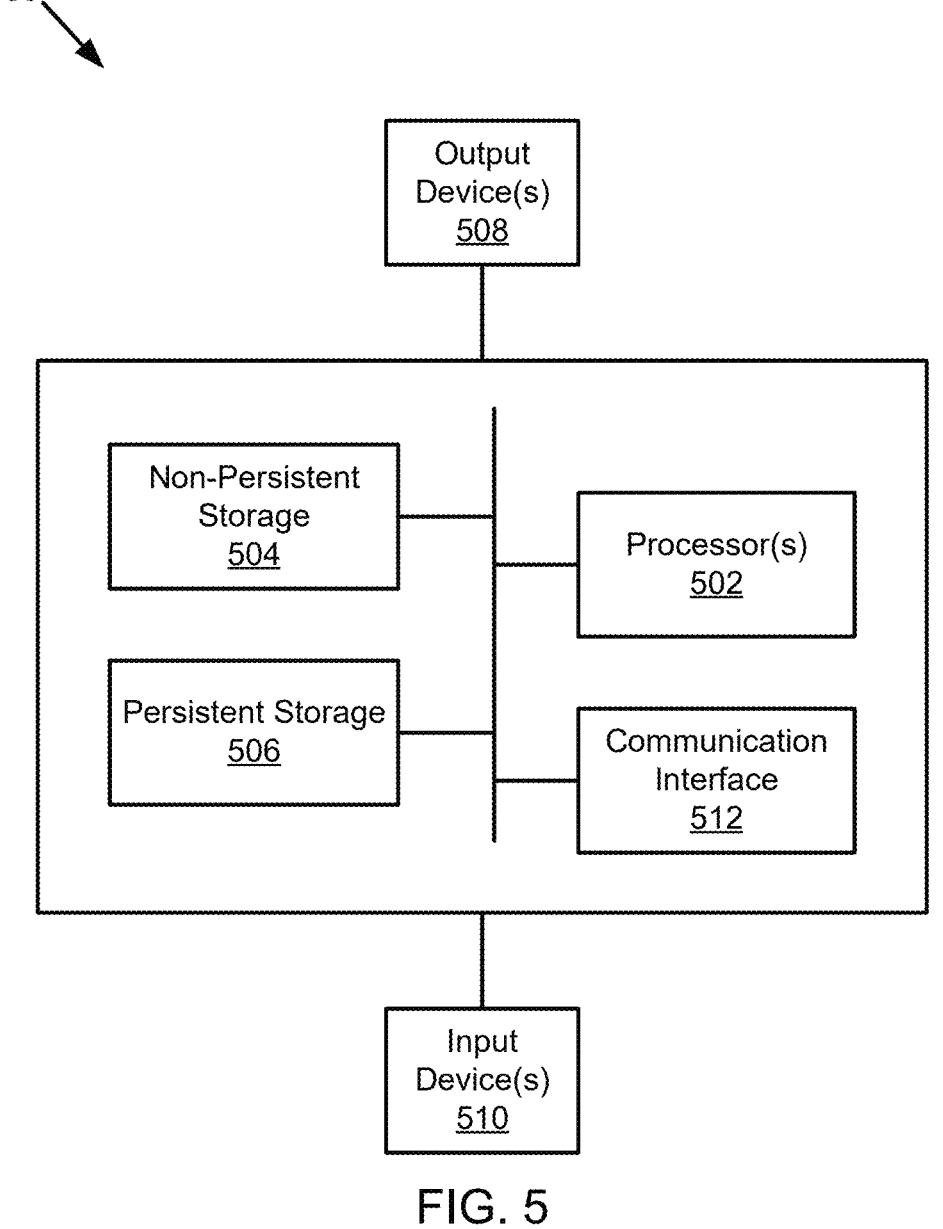
FIG. 5 shows a diagram of a computing device in accordance with one or more embodiments disclosed herein.

Further, in one or more embodiments, a client (e.g., 110A, 110N, etc.) may be implemented as a computing device (e.g., 500, FIG. 5). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., administrators, organization executives, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing virtualization technology. In one or more embodiments, an administrator may be a user with permission (e.g., a user that has root-level access) to make changes to the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 500, FIG. 5) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (140) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (140) may include functionality to, e.g.,: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the storage for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or machine learning (ML) models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the node may split up a request (e.g., an operation, a task, an activity, etc.) with another IN, coordinating its efforts to complete the request more efficiently than if the IN had been responsible for completing the request); (xi) provide software-defined data protection for the clients (e.g., 110A, 110N, etc.); (xii) provide automated data discovery, protection, management, and recovery operations for the clients; (xiii) monitor operational states of the clients; (xiv) regularly back up configuration information of the clients to the storage (120); (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or to the storage; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (140) may communicate with, for example, the storage (120) and/or other storage devices in the system (100).

As described above, the IN (140) may be capable of providing a range of functionalities/services to the users of the clients (e.g., 110A, 110N, etc.). However, not all users may be allowed to receive all the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (140) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (140) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication BW). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (140) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, the term "backup" is intended to be broad in scope. In this manner, example backups (in connection with which embodiments disclosed herein) may be employed include (but not limited to): full backups, partial backups, clones, snapshots, incremental backups, differential backups, etc.

As used herein, "data retention" is a period of time, with a definite start and end, within which the data should be retained in storage (e.g., 120). For example, a set of user requirements and/or technical considerations (e.g., security considerations, performance considerations, etc.) of a data center may be used to generate a data retention policy specifying that user data should be retained in the database for seven years.

As used herein, a "rule" is a guideline used by an SLA component to select a particular target device (or target devices), based on the ability of the target device to meet requirements imposed by the SLA. For example, a rule may specify that an HDD having a particular performance parameter should be used as the target device. A target device selected by the SLA component may be identified as part of a backup policy or other data protection policy.

Further, while a single IN (e.g., 140) is considered above, the term "node" includes any collection of systems or sub-systems that individually or jointly execute a set, or multiple sets, of instructions to provide one or more computer-implemented services. For example, a single IN/server/host may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (140) may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, the IN (140) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that the IN (140) may perform other functionalities without departing from the scope of the embodiments disclosed herein. In one or more embodiments, the IN (140) may be configured to perform (in conjunction with the storage (120)) all, or a portion, of the functionalities described in FIG. 4.

In one or more embodiments, the IN (140) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN (140) may also be implemented as a logical device.

In one or more embodiments, the IN (140) hosts, at least, a forecasting engine (e.g., 202, FIG. 2). The forecasting engine may be a physical or a logical computing device/entity. Additional details of the forecasting engine are described below in reference to FIG. 2.

In the embodiments of the present disclosure, the storage (120) is demonstrated as a separate entity from the IN (140); however, embodiments disclosed herein are not limited as such. The storage (120) may be demonstrated as a part of the IN (e.g., as deployed to the IN (140)).

Turning now to the storage (120), the storage (120) may provide long-term, durable, high read/write throughput data storage/protection with near-infinite scale and low-cost. The storage (120) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. For example, the storage (120) may store data (e.g., backup data; file system metadata; assets; rules and/or procedures for performing backups of the IN (140); etc.). Further, the storage (120) may also occupy a portion of a physical storage/memory device or, alternatively, may span across multiple physical storage/memory devices. The storage (120) may include other and/or additional functionalities without departing from embodiments disclosed herein.

In one or more embodiments, the storage (120) may be implemented using physical devices that provide data storage services (e.g., storing data and providing copies of previously stored data). The devices that provide data storage services may include hardware devices and/or logical devices. For example, the storage (120) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the storage (120) may include a memory device (e.g., a dual in-line memory device), in which data is stored and from which copies of previously stored data are provided. As yet another example, the storage (120) may include a persistent storage device (e.g., an SSD), in which data is stored and from which copies of previously stored data is provided. As yet another example, the storage (120) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the storage (120) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the storage (120) may store/log/record unstructured and/or structured data that may include (or specify), for example (but not limited to): a backup policy/practice; telemetry data including past and present device usage of one or more computing devices; data for execution of applications/services including IN applications and associated end-points; corpuses of annotated data used to build/generate and train processing classifiers for trained ML models; linear, non-linear, and/or ML model parameters; data tags; an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; an identifier of a user (e.g., a unique string or combination of bits associated with a particular user) who initiated a backup (via a client); a distributed model identifier that uniquely identifies a distributed model; a user activity performed on a data item; a cumulative history of user/administrator activity records obtained over a prolonged period of time; a setting (and a version) of a mission critical application executing on the IN (140); configuration information associated with the IN (140); a job detail of a job that has been initiated by the IN; a type of the job (e.g., a non-parallel processing job, a parallel processing job, an analytics job, etc.); information associated with a hardware resource set (discussed below) of the IN; a completion timestamp encoding a date and/or time reflective of the successful completion of a job; a time duration reflecting the length of time expended for executing and completing a job; a backup retention period associated with an asset (e.g., data item); a status of a job (e.g., how many jobs are still active, how many jobs are completed, etc.); a number of requests handled (in parallel) per minute (or per second, per hour, etc.) by the IN (140); a number of errors encountered when handling a job (e.g., a backup process); a documentation that shows how the IN (140) performs against an SLO and/or an SLA; a set of requests received by the IN (140); a set of responses provided (by the IN) to those requests; information regarding an administrator (e.g., a high priority trusted administrator, a low priority trusted administrator, etc.) related to a job; tier/level information of a user (e.g., a high-privileged user, a low-privileged user, etc.); a geographic location (e.g., a country) associated with the user; a timestamp showing when a specific request is processed by the IN (140); computing resource details (including details of hardware components and/or software components) and an IP address of an IN (e.g., 140) hosting an application where a specific request is processed; information with respect to historical metadata (e.g., system logs, applications logs, telemetry data including past and present device usage of one or more computing devices in the system (100), etc.); computing resource details and an IP address of a client that sent a specific request (e.g., to the IN (140)); an existing knowledge base (KB) article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; etc.

In one or more embodiments, information associated with a hardware resource set (e.g., including at least resource related parameters) may specify, for example (but not limited to): a configurable CPU option (e.g., a valid/legitimate vCPU count for the IN (140)), a configurable network resource option (e.g., enabling/disabling single-root input/output virtualization (SR-IOV) for the IN (140)), a configurable memory option (e.g., maximum and minimum memory for the IN (140)), a configurable GPU option (e.g., allowable scheduling policy and/or virtual GPU (vGPU) count combinations for the IN (140)), a configurable DPU option (e.g., legitimacy of disabling inter-integrated circuit (I2C) for the IN (140)), a configurable storage space option (e.g., a list of disk cloning technologies across one or more INs in the system (100)), a configurable storage I/O option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QoS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per analytics engine, a virtual NIC (vNIC) count per IN in the system (100), a wake on LAN support configuration (e.g., supported/enabled, not supported/disabled, etc.), a vGPU count per IN in the system (100), a type of a vGPU scheduling policy (e.g., a "fixed share" vGPU scheduling policy), a storage mode configuration (e.g., an enabled high-performance storage array mode), etc.

In one or more embodiments, metadata (e.g., system logs, application logs, etc.) may be obtained (or dynamically fetched) as they become available (e.g., with no user manual intervention), or by the forecasting engine (e.g., 202, FIG. 2) polling a corresponding client (e.g., 110A) (by making schedule-driven/periodic application programming interface (API) calls to the client without affecting the client's ongoing production workloads) for newer metadata, for example, before analyzing a health state of the client. Based on receiving the API calls from the engine, the client may allow the engine to obtain the metadata.

In one or more embodiments, the metadata may be obtained (or streamed) continuously as they generated, or they may be obtained in batches, for example, in scenarios where (i) the engine (e.g., 202, FIG. 2) receives a metadata analysis request (or a health state check request for a client), (ii) another IN of the system (100) accumulates the metadata and provides them to the engine at fixed time intervals, or (iii) the storage (120) stores the metadata and notify the engine to access the metadata from the storage. In one or more embodiments, metadata may be access-protected for a transmission from the storage (120) to the engine (e.g., 202, FIG. 2), e.g., using encryption.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the storage (120), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors) and/or by the administrators based on, for example, newer (e.g., updated) versions of external information. The unstructured and/or structured data may also be updated when, for example (but not limited to): a set of newer backup rules is received, an ongoing backup process is fully completed, a state of the IN (140) is changed, etc.

While the storage (120) has been illustrated and described as including a limited number and type of data, the storage (120) may store additional, less, and/or different data without departing from the scope of the embodiments disclosed herein. One of ordinary skill will appreciate that the storage (120) may perform other functionalities without departing from the scope of the embodiments disclosed herein.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, the storage nodes, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

While FIG. 1 shows a configuration of components, other system configurations may be used without departing from the scope of the embodiments disclosed herein.

Turning now to FIG. 2, FIG. 2 shows a diagram of an IN (200) in accordance with one or more embodiments disclosed herein. The IN (200) may be an example of the IN discussed above in reference to FIG. 1. The IN (200) includes the forecasting engine (202). The IN (200) may include additional, fewer, and/or different components without departing from the scope of the embodiments disclosed herein. Each component may be operably connected to any of the other components via any combination of wired and/or wireless connections. Each component illustrated in FIG. 2 is discussed below.

In one or more embodiments, as being a physical computing device or a logical computing device, the forecasting engine (202) may include functionality to, at least: (i) employ a probabilistic data packing model/algorithm and forecast data reduction size stability of incoming data writes to cluster/group similar data together (based on packing characteristics of the incoming data (or data writes)) in write journals; (ii) reduce the need for frequent defragmentation (or disk defragmentation) in the storage (e.g., 120, FIG. 1); (iii) improve performance/efficiency of the storage (e.g., a storage array) and reduce relevant disk wear and tear (by performing compressed in-place data writes); (iv) perform track-level compressed data write size derivative forecasting; (v) cluster similar size stability tracks; (vi) pack clustered tracks to correct zones (see FIG. 3); (vii) provide intelligent padding enabled journals (see FIG. 3) to support data that is likely to expand in the future; (viii) provide higher probability of in-place data writes for compressed tracks; (ix) provide packing of time-correlated tracks; and/or (x) consider time and space dimensions for efficient data packing in the storage (a RAID storage).

One of ordinary skill will appreciate that the forecasting engine (202) may perform other functionalities without departing from the scope of the embodiments disclosed herein. The forecasting engine (202) may be implemented as a computing device using hardware (e.g., any number of integrated circuits for processing computer readable instructions), software (e.g., a computer program), or any combination thereof.

In one or more embodiments, packing characteristics of incoming data may include, for example (but not limited to): a type/category of data (e.g., video data, image data, textual data, etc.), a set of attributes of data (e.g., a timestamp that is used to encode data, an identifier of a user who initiated generation of the data, a user access level of the user, a size of the data, a priority level of the data, etc.), an encryption status of data (e.g., encrypted video data may not be compressed, unencrypted textual data may be compressed with different compression ratios (e.g., 128 kB→8 kB, 128 kB→32 kB, etc.), etc.), a compression status of data (e.g., joint photographic experts group (JPEG) data may not be compressed further because the JPEG data is already compressed, uncompressed textual data may be compressed with a high compression ratio, etc.), etc. As indicated, for example, video data and textual data may have different characteristics (e.g., different distributions of compression characteristics/ratios) and based on these characteristics, the forecasting engine (202) may determine whether or not the compression size of the newly rewritten data will be the same as the compression size of previously ingested relevant data.

In one or more embodiments, the storage (e.g., 120, FIG. 1) may include a set of journals (or write journals), in which (i) a journal may include a set of RAID slices (where a RAID slice may host/pack different data (or data writes)), (ii) a RAID slice may include a set of tracks (or disk tracks indicating backend space in the storage to store data) (e.g., sequential tracks, non-sequential tracks, etc.), and (iii) as being a storage array, the storage may include one or more RAID types (e.g., RAID 4+1, RAID 7+1, etc.).

In one or more embodiments, the forecasting engine (202) may perform track-level compressed data write size derivative forecasting. Said another way, by forecasting track-level changes in compression ratios, the forecasting engine (202) may perform (i) inline defragmentation (in the storage (e.g., 120, FIG. 1)) and (ii) high-probability in-place data writes for compressed data writes (or compressed tracks) (where the engine may identify what would be a compression size of, for example, "data write 10" in the future and place "data write 10" in a suitable zone (see FIG. 3) in the storage (so that the probability of generating holes in the storage would be drastically reduced)).

In one or more embodiments, for ingested data (e.g., for a file), the forecasting engine (202) may generate an extent, in which the extent may be a collection of contiguous pages to store the data (e.g., a set of sequential tracks to store the data). For example, for 1 GB video data, the forecasting engine (202) may generate an extent including a set of tracks (e.g., Track 1 . . . Track 1,000), where each track may hold 128 kB data in size. To analyze the data (and perform forecasting on the data), the forecasting engine (202) may perform "per extent" based analysis (not "per track" based analysis) to infer how a distribution of compression sizes changes for the sequential tracks (in order to obtain track-level changes in the compression sizes). In this example, a compression ratio of the video data may not drastically change from the beginning of the video to the end of the video, indicating that all the tracks (in the extent) would have the same (or similar) characteristics (e.g., the same compression ratio would be applied to all the tracks).

As discussed above, per extent, the forecasting engine (202) may infer behavior of the compressed data write size and define a stability score. More specifically, based on the characteristics of the data and track-level changes in compression sizes (e.g., changes in the distribution of compression sizes), the forecasting engine (202) may forecast/define a stability (or a stability score) of the distribution in the future. For example, for 1,000 tracks (of an extent), the forecasting engine may generate a probability distribution for the tracks to infer how the compression ratio changes across the tracks (so that these tracks can be classified correctly into one of the zones, see FIG. 3).

In one or more embodiments, a stability score may be defined as a first derivative of a track-level size change. For example, in a given extent, if a track was written at a 4 kB compressed size (to the storage (e.g., 120, FIG. 1)) and, then, the next write (for the same track) is at a 16 kB compressed size, a stability score of the track can be calculated as +12 (meaning that the compressed size of the track is likely to expand in the future). As yet another example, in a given extent, if a track was written at a 64 kB compressed size (to the storage (e.g., 120, FIG. 1)) and, then, the next write (for the same track) is at a 4 kB compressed size, a stability score of the track can be calculated as −60 (meaning that the compressed size of the track is likely to shrink in the future). As yet another example, in a given extent, if a track was written at a 64 kB compressed size (to the storage (e.g., 120, FIG. 1)) and, then, the next write (for the same track) is at a 64 kB compressed size, a stability score of the track can be calculated as 0 (meaning that the compressed size of the track is likely to stay the same (because the related data is encrypted data)).

In one or more embodiments, while providing packing of time-correlated tracks, the forecasting engine (202) may consider time and/or space dimensions for efficient data packing in the storage (e.g., 120, FIG. 1). For example, consider a scenario where Track 1 and Track 2 are ingested at the same time (by the storage). Even though Track 1 and Track 2 are not related to each other, the forecasting engine may perform time-correlated packing of Track 1 and Track 2, considering previous ingestion patterns of both tracks and the possibility of ingesting both tracks at the same time again in the future. As yet another example, while performing an analysis at an extent level, the forecasting engine (202) may analyze all the sequential tracks (of the extent, which are space-correlated tracks (meaning that the tracks would be located in the same address space of the storage)) to generate a single distribution for the extent.

Figure 3:
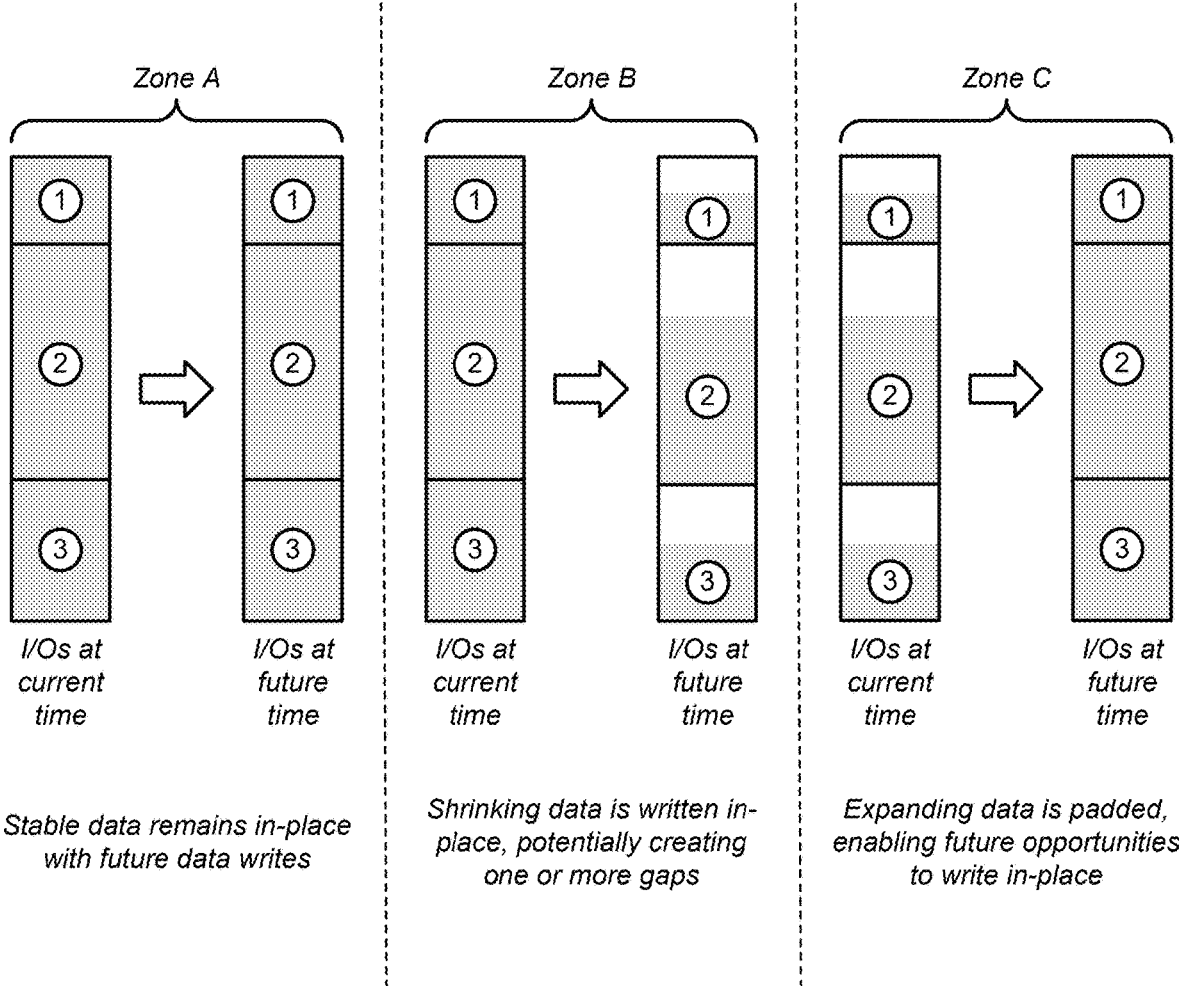
FIG. 3 shows an example inline defragmentation in accordance with one or more embodiments disclosed herein.

Turning now to FIG. 3, FIG. 3 shows an example an example inline defragmentation in accordance with one or more embodiments disclosed herein. The example, illustrated in FIG. 3 and described below, is for explanatory purposes only and not intended to limit the scope disclosed herein.

Referring to FIG. 3, the storage (e.g., 120, FIG. 1) may host three virtual zones (e.g., to pack tracks/data): (i) Zone A, (ii) Zone B, and (iii) Zone C. Zone A may include packed data (or data writes (I/Os), illustrated as "1", "2", and "3"), where the compressed write size of the data is forecasted (by the forecasting engine (e.g., 202, FIG. 2)) to remain stable in the future (e.g., no changes in the distribution of compression sizes across the tracks (of an extent) in the future). Zone B may include packed data (or data writes, illustrated as "1" "2", and "3"), where the compressed write size of the data is forecasted (by the forecasting engine (e.g., 202, FIG. 2)) to shrink in the future (e.g., changes in the distribution of compression sizes across the tracks (of an extent) in the future, where shrinking data would be written in-place (in the future, without packing/relocating the data to another zone) by potentially generating one or more holes/gaps). In this case, the holes (e.g., free storage space) may be used for another data write that can fit into those holes (where the another data write may also be forecasted as its compression size would be shrinking in the future).

Further, Zone C may include packed data (or data writes, illustrated as "1", "2", and "3"), where the compressed write size of the data is forecasted (by the forecasting engine (e.g., 202, FIG. 2)) to expand in the future (e.g., changes in the distribution of compression sizes across the tracks (of an extent) in the future, where expanding data would be written in-place (in the future), with the help of intelligent padding (of Zone C's journal, where the padding (e.g., additional free storage space) is allocated only for that specific I/O) so that future data writes (of the same data) would be supported and still be in-place (not be packed in another zone)).

As indicated above, each zone (e.g., Zone A-Zone C) may have its own journal (or a journal may be distributed accordingly for each zone) and, in order to achieve different inline defragmentation goals (where no offline defragmentation is applied), the forecasting engine (e.g., 202, FIG. 2) may cluster/pack tracks at a zone level, in which (i) tracks that are likely to expand in the future may be placed in Zone C (where intelligent padding/buffer is enabled to support future data compression size expansion), (ii) tracks that are likely to shrink in the future may be placed in Zone B (where small gaps/holes may be expected over time and newer related writes may fit into those gaps), and (iii) regular and uncompressible tracks (which hardly change their compression sizes) may be placed in Zone A. Further, referring to FIG. 3, the intelligent padding of Zone C may be limited based on the storage's (e.g., 120, FIG. 1) data reduction ratio.

In one or more embodiments, while placing/packing tracks in one of the zones, the forecasting engine (e.g., 202, FIG. 2) may apply a set of inline defragmentation thresholds. For example, based on these threshold, the forecasting engine may categorize (i) "low write (indicating non-frequently written data), unstable size (indicating data that is, for example, not encrypted)" tracks as "tracks that require/prefer padding," (ii) "high write (indicating frequently written data), unstable size" tracks as "tracks that require/prefer padding," (iii) "low write, stable size (indicating data that is, for example, encrypted)" tracks as "tracks that require/prefer no padding," and (iv) "high write, stable size" tracks as "tracks that require/prefer no padding."

Figure 4:
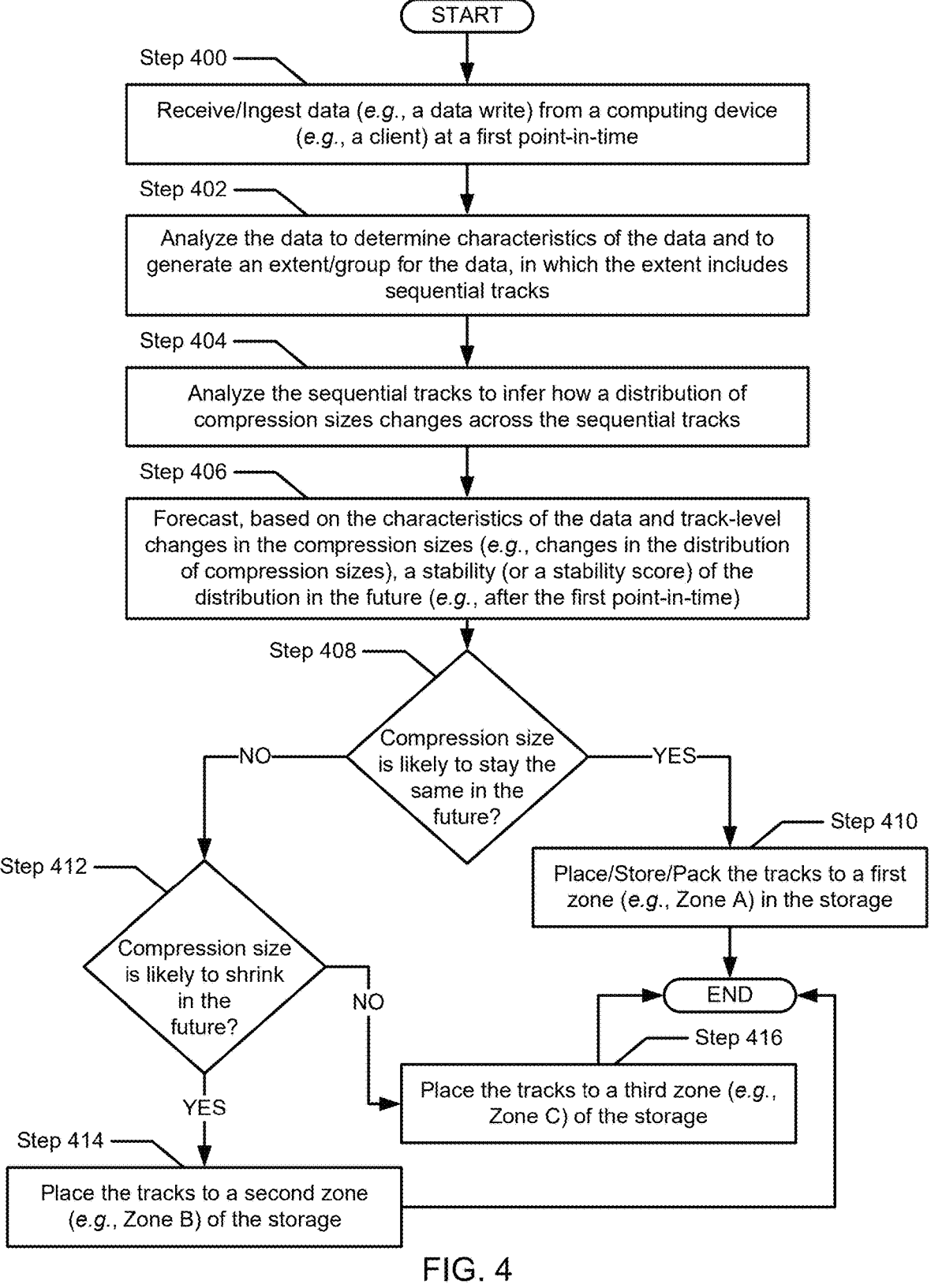
FIG. 4 shows a method for managing data packing in a storage in accordance with one or more embodiments disclosed herein.

FIG. 4 shows a method for managing data packing in a storage (e.g., 120, FIG. 1) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 4, the method shown in FIG. 4 may be executed by, for example, the above-discussed forecasting engine (e.g., 202, FIG. 2). Other components of the system (100) illustrated in FIG. 1 may also execute all or part of the method shown in FIG. 4 without departing from the scope of the embodiments disclosed herein.

In Step 400, the forecasting engine receives data (e.g., a data write) from a computing device (e.g., 110A, FIG. 1) at a first point-in-time. In Step 402, in response to receiving the data, the forecasting engine (by employing a set of linear, non-linear, and/or ML models) analyzes the data to determine characteristics of the data and to generate an extent/group for the data, in which the extent may include sequential tracks.

In Step 404, the forecasting engine (by employing a set of linear, non-linear, and/or ML models) analyzes the sequential tracks to infer how a distribution of compression sizes changes/fluctuates for the sequential tracks to obtain track-level changes in the compression sizes. In Step 406, the forecasting engine (by employing a set of linear, non-linear, and/or ML models (e.g., an autoregressive integrated moving average (ARIMA) model)) forecasts, based on the characteristics of the data and track-level changes in the compression sizes (e.g., changes in the distribution of compression sizes), a stability (or a stability score) of the distribution in the future (e.g., at a second point-in-time, after the first point-in-time).

In Step 408, based on the stability score, the forecasting engine makes a first determination (in real-time or near real-time) as to whether the compression/compressed size is likely to stay the same in the future (e.g., as to whether the distribution would be the same in the second point-in-time). Accordingly, in one or more embodiments, if the result of the first determination is YES, the method proceeds to Step 410. If the result of the first determination is NO, the method proceeds to Step 412.

In Step 410, as a result of the first determination in Step 408 being YES (where the distribution would be the same in the second point-in-time), the forecasting engine places the tracks to a first zone (e.g., Zone A, FIG. 3) in the storage (e.g., 120, FIG. 1), in which the storage further comprises a second zone (e.g., Zone B, FIG. 3) and a third zone (e.g., Zone C, FIG. 3). In one or more embodiments, (i) the tracks may be placed to the first zone because the tracks are uncompressible tracks and/or (ii) the tracks may be placed to the first zone because the data is encrypted video data.

Further, (a) the data may be generated after a user (of the computing device) performs an activity using the computing device before the first point-in-time, (b) when the user reperforms the activity after the first point-in-time and before the second point-in-time, second data would be generated in the second point-in-time and the second data would be placed to the first zone to satisfy an inline defragmentation in the storage, and (c) the data and the second data may be the same.

In one or more embodiments, (i) a first journal of a set of journals may represent the first zone, (ii) a second journal of the set of journals may represent the second zone, (iii) a third journal of the set of journals may represent the third zone, and (iv) the first zone, the second zone, and the third zone may be different zones in the storage. In one or more embodiments, the method may end following Step 410.

In Step 412, as a result of the first determination in Step 408 being NO (where the distribution would not be the same in the second point-in-time), the forecasting engine makes a second determination (in real-time or near real-time) as to whether the compression size is likely to shrink in the future (e.g., as to whether the distribution would be shrinking in the second point-in-time). Accordingly, in one or more embodiments, if the result of the second determination is YES, the method proceeds to Step 414. If the result of the second determination is NO, the method proceeds to Step 416.

In Step 414, as a result of the second determination in Step 412 being YES (where the distribution would be shrinking in the second point-in-time), the forecasting engine places the tracks to the second zone in the storage. In one or more embodiments, (i) the tracks may be placed to the second zone because the tracks are compressible tracks and/or (ii) the tracks may be placed to the second zone because the data is unencrypted product purchasing data.

In one or more embodiments, (i) after placing the tracks to the second zone, available storage space would be generated in the second zone over time, (ii) second data that would fit into the available storage space would be placed to the storage space at a third point-in-time without searching for second available storage space in the first zone or in the third zone, and (iii) the third point-in-time is after the second point-in-time.

Further, (a) the data may be generated after a user performs an activity using the computing device before the first point-in-time, (b) when the user reperforms the activity after the first point-in-time and before the second point-in-time, second data would be generated in the second point-in-time and the second data would be placed to the second zone to satisfy an inline defragmentation in the storage, and (c) wherein the data and the second data may be the same. In one or more embodiments, the method may end following Step 414.

In Step 416, as a result of the second determination in Step 412 being NO (where the distribution would be expanding in the second point-in-time), the forecasting engine places the tracks to the third zone in the storage. In one or more embodiments, (i) the third zone may include available storage space to support placement of second data to the third zone in the second point-in-time without searching for second available storage space in the first zone or in the second zone and (ii) the second data may be the expanded version of the data. In one or more embodiments, the method may end following Step 416.

Turning now to FIG. 5, FIG. 5 shows a diagram of a computing device in accordance with one or more embodiments disclosed herein.

In one or more embodiments disclosed herein, the computing device (500) may include one or more computer processors (502), non-persistent storage (504) (e.g., volatile memory, such as RAM, cache memory), persistent storage (506) (e.g., a non-transitory computer readable medium, a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing data packing in a storage, the method comprising:
 receiving data from a computing device at a first point-in-time;
 analyzing the data to:
  determine characteristics of the data, and
  generate an extent for the data, wherein the extent comprises sequential tracks;
 analyzing the sequential tracks to infer how a distribution of compression sizes changes for the sequential tracks to obtain track-level changes in the compression sizes;
 forecasting, based on the characteristics of the data and the track-level changes in the compression sizes, a stability score of the distribution at a second point-in-time, wherein the second point-in-time is after the first point-in-time;
 making a determination, based on the stability score, that the distribution would be the same in the second point-in-time; and
 placing, based on the determination, the tracks to a first zone in the storage, wherein the storage further comprises a second zone and a third zone.

2. The method of claim 1, wherein the characteristics of the data comprises an encryption status of the data and a type of the data.

3. The method of claim 1, wherein the stability score is forecasted using an autoregressive integrated moving average (ARIMA) model.

4. The method of claim 1, wherein the tracks are placed to the first zone because the tracks are uncompressible tracks.

5. The method of claim 1, wherein the tracks are placed to the first zone because the data is encrypted video data.

6. The method of claim 1,
 wherein the data is generated after a user performs an activity using the computing device before the first point-in-time,
 wherein, when the user reperforms the activity after the first point-in-time and before the second point-in-time, second data would be generated in the second point-in-time and the second data would be placed to the first zone to satisfy an inline defragmentation in the storage, and
 wherein the data and the second data are the same.

7. The method of claim 1,
 wherein the storage is a redundant array of independent disks (RAID) storage, wherein the storage comprises a set of journals, wherein a journal of the set of journals comprises a set of RAID slices, and wherein a RAID slice of the set of RAID slices comprises the sequential tracks.

8. The method of claim 1, wherein a first journal of a set of journals represents the first zone, wherein a second journal of the set of journals represents the second zone, wherein a third journal of the set of journals represents the third zone, and wherein the first zone, the second zone, and the third zone are different zones in the storage.

9. A method for managing data packing in a storage, the method comprising:

receiving data from a computing device at a first point-in-time;

analyzing the data to:

determine characteristics of the data, and generate an extent for the data, wherein the extent comprises sequential tracks;

analyzing the sequential tracks to infer how a distribution of compression sizes changes for the sequential tracks to obtain track-level changes in the compression sizes;

forecasting, based on the characteristics of the data and track-level changes in the compression sizes, a stability score of the distribution at a second point-in-time, wherein the second point-in-time is after the first point-in-time;

making a determination, based on the stability score, that the distribution would not be the same in the second point-in-time;

making a second determination, based on the determination, that the distribution would be shrinking in the second point-in-time; and placing, based on the second determination, the tracks to a second zone in the storage, wherein the storage further comprises a first zone and a third zone.

10. The method of claim 9, wherein, after placing the tracks to the second zone, available storage space would be generated in the second zone over time, wherein second data that would fit into the available storage space would be placed to the storage space at a third point-in-time without searching for second available storage space in the first zone or in the third zone, and wherein the third point-in-time is after the second point-in-time.

11. The method of claim 9, wherein the characteristics of the data comprises an encryption status of the data and a type of the data.

12. The method of claim 9, wherein the stability score is forecasted using an autoregressive integrated moving average (ARIMA) model.

13. The method of claim 9, wherein the tracks are placed to the second zone because the tracks are compressible tracks.

14. The method of claim 9, wherein the tracks are placed to the second zone because the data is unencrypted product purchasing data.

15. The method of claim 9, wherein the data is generated after a user performs an activity using the computing device before the first point-in-time, wherein, when the user reperforms the activity after the first point-in-time and before the second point-in-time, second data would be generated in the second point-in-time and the second data would be placed to the second zone to satisfy an inline defragmentation in the storage, and wherein the data and the second data are the same.

16. The method of claim 9, wherein the storage is a redundant array of independent disks (RAID) storage, wherein the storage comprises a set of journals, wherein a journal of the set of journals comprises a set of RAID slices, and wherein a RAID slice of the set of RAID slices comprises the sequential tracks.

17. The method of claim 9, wherein a first journal of a set of journals represents the first zone, wherein a second journal of the set of journals represents the second zone, wherein a third journal of the set of journals represents the third zone, and wherein the first zone, the second zone, and the third zone are different zones in the storage.

18. A method for managing data packing in a storage, the method comprising:

receiving data from a computing device at a first point-in-time;

analyzing the data to:

determine characteristics of the data, and generate an extent for the data, wherein the extent comprises sequential tracks;

analyzing the sequential tracks to infer how a distribution of compression sizes changes for the sequential tracks to obtain track-level changes in the compression sizes;

forecasting, based on the characteristics of the data and track-level changes in the compression sizes, a stability score of the distribution at a second point-in-time, wherein the second point-in-time is after the first point-in-time;

making a determination, based on the stability score, that the distribution would not be the same in the second point-in-time;

making a second determination, based on the determination, that the distribution would be expanding in the second point-in-time; and placing, based on the second determination, the tracks to a third zone in the storage, wherein the storage further comprises a first zone and a second zone.

19. The method of claim 18, wherein the third zone comprises available storage space to support placement of second data to the third zone in the second point-in-time without searching for second available storage space in the first zone or in the second zone, and wherein the second data is expanded version of the data.

20. The method of claim 18, wherein the characteristics of the data comprises an encryption status of the data and a type of the data.

* * * * *